United States Patent
Bayyapu

(10) Patent No.: US 7,516,135 B2
(45) Date of Patent: Apr. 7, 2009

(54) DYNAMICALLY MANAGING DATA CONVEYANCE BETWEEN COMPUTING DEVICES

(75) Inventor: Pavan Bayyapu, Sunnyvale, CA (US)

(73) Assignee: SAP Aktiengesellschaft, Walldorf (DE)

(*) Notice: Subject to any disclaimer, the term of this patent is extended or adjusted under 35 U.S.C. 154(b) by 404 days.

(21) Appl. No.: 10/449,920

(22) Filed: May 30, 2003

(65) Prior Publication Data
US 2004/0243617 A1 Dec. 2, 2004

(51) Int. Cl.
G06F 7/00 (2006.01)
(52) U.S. Cl. ............... 707/10; 707/102; 714/1; 709/237
(58) Field of Classification Search .......... 709/201, 709/203, 237, 204, 206, 207, 236, 227–232, 709/208; 719/313, 319; 707/201, 200, 10, 707/104.1, 102, 202; 715/513, 234, 749; 714/1
See application file for complete search history.

(56) References Cited

U.S. PATENT DOCUMENTS

| | | | | |
|---|---|---|---|---|
| 5,862,325 A * | 1/1999 | Reed et al. ........... 709/201 |
| 6,044,205 A * | 3/2000 | Reed et al. ........... 709/201 |
| 6,119,167 A * | 9/2000 | Boyle et al. .......... 709/234 |
| 6,138,009 A * | 10/2000 | Birgerson ............ 455/419 |
| 6,175,832 B1 * | 1/2001 | Luzzi et al. .......... 707/10 |
| 6,275,858 B1 * | 8/2001 | Bates et al. .......... 709/228 |
| 6,311,187 B1 * | 10/2001 | Jeyaraman ........... 707/10 |
| 6,360,256 B1 * | 3/2002 | Lim ................... 709/223 |
| 6,434,572 B2 * | 8/2002 | Derzay et al. ........ 707/104.1 |
| 6,654,786 B1 * | 11/2003 | Fox et al. ............ 709/203 |
| 2002/0004798 A1 * | 1/2002 | Babula et al. ........ 707/104.1 |
| 2002/0010783 A1 | 1/2002 | Primak et al. |
| 2002/0065454 A1 | 5/2002 | Lebel et al. |
| 2002/0095454 A1 | 7/2002 | Reed et al. |
| 2002/0129096 A1 * | 9/2002 | Mansour et al. ...... 709/203 |
| 2002/0152318 A1 * | 10/2002 | Menon et al. ........ 709/231 |
| 2003/0050955 A1 * | 3/2003 | Eatough et al. ....... 709/201 |
| 2004/0054713 A1 * | 3/2004 | Rignell et al. ........ 709/203 |
| 2004/0186860 A1 * | 9/2004 | Lee et al. ............ 707/200 |
| 2005/0015488 A1 * | 1/2005 | Bayyapu ............. 709/225 |

OTHER PUBLICATIONS

Cao et al., Reliable Message Delivery for Mobile Agents: Push or Pull, Parallel and Distributed Systems, 2002. Poceedings, Ninth International Conf. on, Dec. 17-20, 2002, pp. 314-320.*
PCT International Search Report, PCT/US2004/016464, Dec. 3, 2004, pp. 1-5.*

(Continued)

*Primary Examiner*—Greta L Robinson
(74) *Attorney, Agent, or Firm*—Fish & Richardson, P.C.

(57) ABSTRACT

Dynamically managing data conveyance between computing devices may be achieved by a data distribution device establishing a data pull service in response to a subscription request from a data acquisition device, the data pull service having a first refresh interval, determining whether new data is available, if new data is available, determining whether the data is responsive to the subscription request, if the data is responsive to the subscription request, determining an interval for the responsive new data becoming available, and determining a second refresh interval for the data pull service based on the determined interval.

42 Claims, 7 Drawing Sheets

OTHER PUBLICATIONS

Just van den Broecke, Pushlets: Send events from servlets to DHTML client browsers, Mar. 2000, Java World, Feeling Innovation, http://www.javaworld.com/javaworld/jw-03-2000/jw-03-pushlet.html.

Java Q&A Experts, An in-depth look at RMI callbacks Apr. 20, 1999, Java World, Feeling Innovation, http://www.javaworld.com/javaworld/javaqa/1999-04/05-rmicallback.html.

W3C World Wide Web consortium, Leading the Web to Its Full Potential, Copyright 1994-2003, http://www.w3.org/.

W3C Architecture domain, HTTP-Hypertext Transfer Protocol, Copyright 1996-2003, http://www.w3.org/Protocols/.

W3C Specs, HTTP Specifications and Drafts, Yves Lafon, Mar. 4, 2002, http://www.w3.org/Protocols/Specs.html.

Just van den Broecke, Pushlets, SourceFORGE.net, Aug. 6, 2002, http://pushlets.com/site-mail.html.

Just van den Broecke, Pushlets-Whitepaper, Just Objects B.V., Aug. 6, 2002, http://www.pushlets.com/doc/whitepaper-all.html.

Java.sun.com, Java Servlet Technology, Implementations & Specifications, Jan. 9, 2003, http://java.sun.com/products/servlet/download.html.

Danny Coward, Java Servlet Specification, Version 2.3, Aug. 13, 2001.

* cited by examiner

DYNAMICALLY MANAGING DATA CONVEYANCE BETWEEN COMPUTING DEVICES

BACKGROUND

The present application describes systems and techniques relating to dynamically managing data conveyance between devices such as computing devices.

In general, a client may be updated to receive new data from a server in either of two ways. First, a browser (or other client-side application) may intermittently ask the server for new data (often referred to as "pulling" data). Second, the server may send new data to the client as the data becomes available (often referred to as "pushing" data).

SUMMARY

In one general aspect, a technique for dynamically managing data conveyance between computing devices may be facilitated by a process performed at a data distribution device. The process may include establishing a data pull service in response to a subscription request from a data acquisition device, the data pull service having a first refresh interval, determining whether new data is available, and, if new data is available, determining whether the data is responsive to the subscription request. The process also may include determining, if the data is responsive to the subscription request, an interval for the responsive new data becoming available and determining a second refresh interval for the data pull service based on the determined interval. Determining a second refresh interval could include analyzing intervals at which responsive new data is becoming available at the data distribution device. The process may be implemented manually, by machine, by instructions stored in a computer-readable medium, or otherwise.

Some implementations may include determining whether a message requesting new data has been received and, if a message requesting data has been received, sending a message including a second refresh interval.

Certain implementations may include receiving a message including a subscription request, determining an attribute of data responsive to the subscription request, and selecting, based on a current state of a data distribution device and the attribute of the responsive data, between a data pull service and a data push service for providing the responsive data. Particular implementations may include determining, if the selected service includes the data pull service, a first refresh interval and sending a message including the first refresh interval.

Some implementations may include determining whether new data is responsive to a subscription request for a data push service and, if the data is responsive to a subscription request for a data push service, sending a message including the data.

Certain implementations may include tracking an amount of time for responsive new data becoming available and sending a message including a disconnect notification if a predefined period of time has expired.

Some implementations may include determining whether a message indicating that a service should be stopped has been received and, if a stoppage message has been received, releasing resources for the service.

Particular implementations may include sending a message including an acknowledge request and determining whether a response to the acknowledge request has been received. Certain implementations may include deciding to use a data pull service if a response to the acknowledge request has not been received.

In another general aspect, a technique for dynamically managing data conveyance between computing devices may be facilitated by a process performed at a data acquisition device. The process may include determining whether a first refresh interval has expired for a data pull service and sending a message requesting new data if the first refresh interval has expired. The process also may include determining whether a message including new data has been received, updating existing data if a message including new data has been received, determining whether a message including a second refresh interval has been received, and updating the first refresh interval with the second refresh interval if a message including a second refresh interval has been received. The technique may be implemented manually, by machine, by instructions stored in a computer-readable medium, or otherwise.

Some implementations may include determining whether data is desired by a process and sending, if data is desired, a message including a subscription request.

Certain implementations may include determining whether a message regarding a selected service has been received and determining, if a message regarding a selected service has been received, whether the selected service includes a data pull service or a data push service. If the service includes a data push service, implementations may also include establishing a persistent connection, determining whether a message including new data has been received, and updating existing data if a message including new data has been received.

Particular implementations may include determining whether a service is still desired and sending, if the service is not still desired, a message indicating that the service should be stopped.

Some implementations may include determining whether a message including a disconnect notification has been received and determining, if a disconnect notification has been received, whether disconnection is acceptable.

Certain implementations may include determining whether an acknowledge request has been received and, if an acknowledge request has been received, sending a response.

In another general aspect, a system includes a data acquisition device and a data distribution device. The data acquisition device is operable to determine whether data is desired by a process, send a message including a subscription request if data is desired, determine whether an acknowledge request has been received, send a response if an acknowledge request has been received, determine whether a message regarding a selected service has been received, and determine, if a message regarding a selected service has been received, whether the selected service is a data pull service or a data push service, the data pull service having a first refresh interval. If the service is a data pull service, the data acquisition device is further operable to determine whether the first refresh interval has expired, send a message requesting new data if the first refresh interval has expired, determine whether a message including new data and a second refresh interval has been received, and update existing data and the first refresh interval if a message including new data and a second refresh interval has been received. If the service is a data push service, the data acquisition device is operable to establish a persistent connection, determine whether a message including new data has been received, and update existing data if a message including new data has been received. The data acquisition device is further operable to determine whether the selected service is still desired and send a message indicating that the service should be stopped if the service is not still desired. The data acquisition device is additionally operable to determine whether a message including a disconnect notification has been received and determine, if a disconnect notification has been received, whether disconnection is acceptable. The data distribution device is operable to determine whether the message including the subscription request has been received and, if a subscription request has been received, determine an attribute of data responsive to the subscription request, send a message including an acknowledge request, determine whether a response to the acknowledge request has been received, and select, based on a current state of the data distribution device, the attribute of the responsive data, and the response to the acknowledge request, if any, between the data pull service and the data push service for providing the responsive data. If the selected service is a data pull service, the data distribution device is operable to determine the first refresh interval, send the message regarding the selected service, the message including the refresh interval, determine whether new data is available, determine whether the data is responsive to the subscription request, store the data if the data is responsive, determine the second refresh interval for the data pull service based on intervals at which responsive new data is becoming available, receive the message requesting new data, and send, if the message requesting new data has been received, the message including the new data and the second refresh interval. If the selected service is a data push service, the data distribution device is operable to send the message regarding the selected service, determine whether new data is available, determine whether the data is responsive to the subscription request, and send a message including the data if the data is responsive to the subscription request. The data distribution device is further operable to track an amount of time for responsive new data becoming available and send the message including a disconnect notification if a predefined period of time has expired. The data distribution device is additionally operable to determine whether the service stoppage message has been received and release resources for the service if the service stoppage message has been received.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to dynamically managing data conveyance between computing devices. In particular, the described systems and techniques relate to implementing a selected service for conveying data between computing devices.

Figure 1:
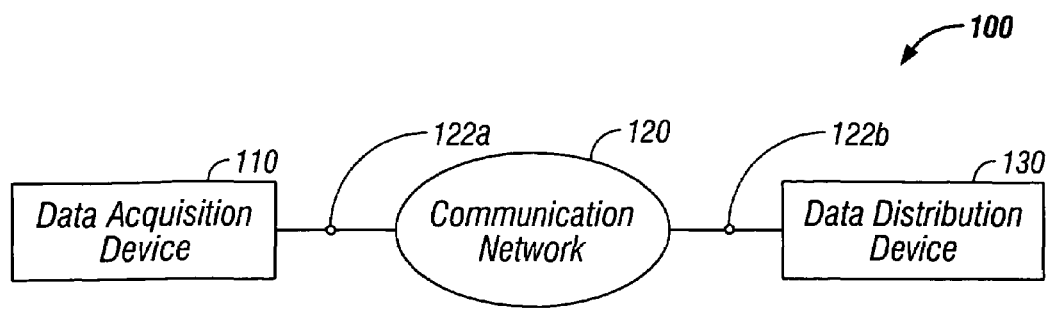
FIG. 1 shows a block diagram of a system for dynamically managing data conveyance between computing devices.

FIG. 1 illustrates a system 100 for dynamically managing data conveyance between computing devices. In general, system 100 includes a data acquisition device 110, a communication network 120, and a data distribution device 130. In operation, data distribution device 130 is receiving and/or generating data that may be of interest to data acquisition device 110. To convey the data to data acquisition device 110, however, data distribution device 130 and data acquisition device 110 must understand how the data is to be conveyed.

Data acquisition device 110 includes devices for facilitating the storage, manipulation, and conveyance of data. For example, device 110 may include memory, which may include random-access memory (RAM), read-only memory (ROM), compact-disk read-only memory (CD-ROM), registers, and/or any other appropriate volatile or non-volatile information storage device. The memory may store the conveyed data, instructions for the data acquisition device, the state of the data acquisition device, and/or any other appropriate information. The conveyed data may be text, audio, graphics, video, statistics, measurements, and/or any other appropriate information. As another example, device 110 may include a processor, such as, for example, an analog processor, a digital processor, a biological processor, an atomic processor, or any other appropriate device for manipulating information in a logical manner. As a further example, device 110 may include a communication interface, such as, for example, a network interface card, a modem, a wireless transceiver, or any other appropriate device for sending and/or receiving information. The data acquisition device may also include a user input device and/or a user output device. In particular implementations, device 110 may be a personal digital assistant (PDA), a personal computer (PC), a workstation (WS), or any other appropriate computing device.

Note that although data acquisition device 110 is illustrated as being remote from data distribution device 130, device 110 is only "remote" in the sense that it is not physically part of data distribution device 130. Thus, data acquisition device 110 may be geographically close to or far from data distribution device 130.

Data acquisition device 110 and data distribution device 130 are coupled to communication network 120 by links 122a and 122b. Links 122a and 122b may be metallic wire, such as for example, twisted-pair wire or coaxial cable, fiber-optic cable, electromagnetic wireless channels, such as, for example, an IEEE 802.11 channel, a Bluetooth™ channel, a cellular channel, or an infrared channel, and/or any other appropriate type of wireline or wireless path for transferring information.

Communication network 120 may include any appropriate types of devices for conveying information from data distribution device 130 to data acquisition device 110. For example, network 120 may include bridges, routers, switches, servers, repeaters, transceivers, and/or hubs. Furthermore, these components may use wireline and/or wireless techniques. In general, network 120 may be any type of communication network, such as, for example, a frame relay network, an X.25 network, the Internet, or the Public Switched Telephone Network (PSTN). Note that communication network 120 may convey data between a variety of devices such as telephones, PCs, servers, and WSs contemporaneously with conveying data from data distribution device 130 to data acquisition device 110.

Data distribution device 130 also includes devices for facilitating the storage, manipulation, and conveyance of data. For example, data distribution device 130 may include memory, which may include RAM, ROM, CD-ROM, registers, and/or any other appropriate volatile or non-volatile information storage device. The memory may store the data to be conveyed, instructions for the data distribution device, the state of data acquisition device 110, and/or any other appropriate information. The data may be created by device 130, received through communication network 120 from other devices, or otherwise captured at data distribution device 130. As another example, device 130 may include a processor, such as, for example, an analog processor, a digital processor, a biological processor, an atomic processor, or any other appropriate device for manipulating information in a logical manner. As a further example, device 130 may include a communication interface, such as, for example, a network interface card, a modem, a transceiver, or any other appropriate device for sending and/or receiving information. In particular implementations, device 130 may be a server and enter into a client-server relation with data acquisition device 110.

In one mode of operation, when data acquisition device 110 determines that data is desired by a process, the device generates a message including a subscription request. The process may, for example, be a user command, an application, a hard-wired data gathering scheme, or any other appropriate technique. Furthermore, the subscription request may be any appropriate type of request for a data service. The subscription request may, for example, include information about the desired data, such as, for instance, type and/or location. In particular implementations, the subscription request may be a HyperText Transfer Protocol (HTTP) request with the responsive data subject as an HTTP parameter. Moreover, in certain implementations, an HTTP parameter could specify the preferred type of data service. The data acquisition device then sends the subscription request message to communication network 120, which conveys the message to data distribution device 130. Note that a message may have one or more segments and/or be a part of a larger message.

Upon receiving the subscription request, data distribution device 130 selects a type of service to use to provide data in response to the subscription request. In general, device 130 may select between a data push service and a data pull service. For a data push service, data distribution device 130 maintains a persistent connection with data acquisition device 110 and sends new data to the data acquisition device without waiting for a request from the data acquisition device. For a data pull service, on the other hand, data distribution device 130 waits for data acquisition device 110 to request new data before sending the new data. The data push/pull services may be implemented using Java and Java Server Pages (JSPs) or any other appropriate type of language/protocol.

A data pull service has several advantages. For example, a data pull service does not need a persistent connection; a connection may be set up each time data is to be conveyed. Furthermore, the service should work even if there are buffering proxy servers between the data acquisition device and the data distribution device. Additionally, the service may be implemented on a "thin" client, allowing little impact on the data acquisition device, and may be implemented using HTTP, allowing the service to be portable across different brands of browsers.

A data pull service does have drawbacks, however. For example, overhead is consumed, in terms of processing, time, or both, each time a connection is established to convey data. Moreover, this may require substantial overhead if the data acquisition device is requesting data on a frequent basis. On the other hand, if data is not requested at a high enough frequency, the data distribution device may have to store large amounts of data for the data acquisition device for extended periods of time. As another example, the data acquisition device may not get data responsive to the subscription request as soon as the data becomes available at the data distribution device.

A data push service has advantages and disadvantages too. On the positive side, a data push service allows the data acquisition device to be notified as soon as responsive data becomes available at the data distribution device. Also, if a browser is used, a "thin" client may be used because a browser typically does not need to download other components to look after its maintenance. Furthermore, if an HTTP connection is used, the connection should be portable across different browsers. On the negative side, the number of socket connections at the data distribution device may limit the number of persistent connections available, and buffering proxy servers may cause problems with the connection.

The type of service to select may be based on a current state of the data distribution device and/or one or more attributes of the subscription request, which could reflect attributes of data responsive to the subscription request. A state of the data distribution device may be based on the number of connections available at the data distribution device, the amount of data being handled by the data distribution device, network latency to and/or from the data distribution device, the number of data acquisition devices being served by the data distribution device, and/or any other appropriate criterion affecting the data distribution device's ability to provide data. Attributes of the subscription request may include the type of data acquisition device requesting data service, a specification of the preferred type of data service, attributes of the responsive data, and/or any other appropriate criterion that may be derived from a subscription request. Attributes of the responsive data may include type of data, the quality of service (QOS) desired for the data, the estimated frequency at which new data will become available for the service, and/or the amount of data for the service. In particular implementations, however, a non-data attribute such as a user identifier or a device identifier may be used in place of a data attribute, although the non-data attribute may reflect a data attribute.

Selecting a service, therefore, may depend on a variety of factors. For example, if the data distribution device already has a large number of connections established, and the subscription does not require a persistent connection, the device may decide to establish a data pull service. As another example, if the data distribution device estimates that the data acquisition device will often try to request data from the data distribution device, a data push service may be established. As a further example, if a high QOS is desired, a data push service may be used. In particular implementations, the data distribution device may try to convert an already existing data push service to a data pull service to accommodate a request for which a data push service should be provided.

If data distribution device 130 decides to use a data pull service, the data distribution device sends a message to data acquisition device 110 regarding the selected service. The message may specify the data service type. Furthermore, the message may specify whether acknowledgment is required. If acknowledgement is required, the data acquisition device may report back to the data distribution device. The data distribution device and the data acquisition device may also negotiate any appropriate parameters.

Then, data conveyance occurs when the data acquisition device requests new data from the data distribution device, typically at the expiration of a refresh interval. If there is new data that is responsive to the subscription request when the data acquisition device contacts the data distribution device, the data distribution device sends at least that data to the data acquisition device. If the data distribution device maintains the state of the data acquisition device, just the new data may be sent.

If the data distribution device decides to use a data push service, the data distribution device also sends a message regarding the selected service to data acquisition device 110. The message may specify the selected data service type. Furthermore, the message may specify whether acknowledgment is required. If acknowledgement is required, the data acquisition device may report back to the data distribution device. The data distribution device and the data acquisition device may also negotiate any appropriate parameters.

In this case, however, the data acquisition device and the data distribution device maintain a persistent connection to convey the data, and the data distribution device sends new data that is responsive to the subscription request to the data acquisition device as the data becomes available. In particular implementations, the data acquisition device provides a handle, sometimes referred to as a response object in servlet technology, to push the information. Furthermore, if the data distribution device maintains the state of the data acquisition device, the data distribution device may just send the new responsive data; this may be viewed as a streaming approach because the data is sent as a flow. To try to mollify the potential buffering-proxy-server problem, the data distribution device may include dummy data with the actual data to try to match the size of the proxy server's buffers.

In implementations where the data distribution device maintains the state of the data acquisition device and, thus, is able to provide the data acquisition device with just new data, there may need to be a way to keep the data persistent across the roundtrips on the data acquisition device side. This may lead to a solution in which one frame of an interface keeps refreshing to obtain the new data, if any, and passing the obtained data to other interested frames. In a non-frame scenario, the data acquisition device may need to refresh the interface by retrieving previously obtained data as well as the new data.

The system illustrated by FIG. 1 and described above may have a variety of features. For example, the data conveyance between computing devices may have the ability to adapt by using the best of the push/pull alternatives. As another example, the data conveyance may be easy to implement and extend. As a further example, the fusion of the push and pull technologies may make the callback technology more robust. Furthermore, if "thin" clients can be implemented, the data conveyance may be more portable across various browsers because difficulties involved with heavy clients, like applets, may be eliminated. Additionally, if implemented using HTTP, firewall blockage issues should be minimal. As a further example, only one persistent connection may be established per client.

The techniques described herein may be used for any type of scenario in which a data distribution device wants to update a data acquisition device periodically about new data. Examples of such scenarios include Web chat, stock quotes, dynamic auction applications, dynamic advertisement (e.g., pushing promotions to a user based on the user's profile and/or behavior), travel information updates, and Webinar (i.e., Web seminars).

In certain implementations, the refresh interval for a data pull service may be initially determined by the data distribution device and sent to the data acquisition device, possibly in the message regarding the selected service. Thus, the data acquisition device will know when to request data from the data distribution device. The refresh interval may be based on a state of the data distribution device and/or one or more attributes of the responsive data. Items to consider are the number of connections available at the data distribution device, the number of data acquisition devices being sourced by the data distribution device, network latency to and/or from the data distribution device, the amount of data being handled by the data distribution device, the quality of service (QOS) desired for the responsive data, the frequency at which responsive data is expected to become available at the data distribution device, the amount of responsive data that is expected to become available at the data distribution device, the overhead in setting up a connection, and/or any other appropriate criterion affecting the ability of the data distribution device to provide data.

For example, if the number of connections available at the data distribution device is high, the QOS for the responsive data is high, and/or the frequency at which the responsive data is expected to become available is high, the refresh interval may be short. On the other hand, if the number of connections available at the data distribution device is low, the QOS for the responsive data is low, and/or the frequency at which the responsive data is expected to become available is low, the refresh interval may be long. For instance, if the frequency at which responsive data is expected to become available at the data distribution device is low, there is not much of a point in having a short refresh interval. Typically, in fact, the refresh interval should not be shorter than the data availability rate at the data distribution device. Of course, if different factors point in different directions, a balancing may occur.

Additionally, the refresh interval may be updated as responsive data becomes available at the data distribution device, to make the refresh interval reflect the rate at which responsive data is becoming available at the data acquisition device. Note that the specification of a lower limit and an upper limit for the refresh interval may be prudent, so that the tuning application cannot take excessive control of the situation. The refresh interval update may be implemented in any appropriate language.

As one example of tuning the refresh interval, let:

$R_{init}$=the initial refresh interval for the data acquisition device, $R_{min}$=the allowed minimum refresh interval for the data acquisition device, $R_{max}$=the allowed maximum refresh interval for the data acquisition device, $R_n$=the refresh interval at the end of n'th event, and $E_n$=the average interval at which events were available for the data acquisition device until n'th event, then $$R_{n+1}=CF(E_n, R_n),$$

where CF is a convergence function. Thus, in this approach, the weight given to the availability interval of every event is the same. In other implementations, though, there may be an approach in which events that are generated recently get precedence over the events generated earlier. Thus, more preference is given to the current trend.

One form of the convergence function (CF) may be:

$$CF(R_{n+1})=avg(R_n, \max\{\max\{R_{min}, E_n\}, \min\{R_{max}, E_n\}\}).$$

The average is taken to slowdown converge of $R_{n+1}$ towards $E_n$.

There may also be a parameter to govern the convergence rate. For example, let $\alpha$ ($0<\alpha<1$) be the confidence level of the existing refresh rate Rn. The new refresh rate thus can be calculated as follows:

$$Rn+1=CF(Rn+1)=(\alpha*Rn+(1-\alpha)*\max\{\max\{Rmin, En\}, \min\{Rmax, En\}\}).$$

Note that Rinit, Rmin, Rmax, and $\alpha$ can be tuned based on the requirements of the application.

By tuning the refresh interval, the data distribution device may strike a balance between update latency and overhead. Thus, for services in which responsive new data is available fairly often, the refresh interval may be shortened to allow for quicker transfer of the data to the data acquisition device. On the other hand, for services in which responsive new data is available at a lower frequency, the refresh interval may be lengthened to lower overhead in establishing connections, especially when there is no responsive new data. Additionally, the data distribution device may compensate for a service that experiences different data availability rates over time.

In some implementations, the data distribution device may provide a data pull service, a data push service, and/or any other type of data service to a data acquisition device. In certain implementations, however, the data push service may not be implemented.

Figure 2:
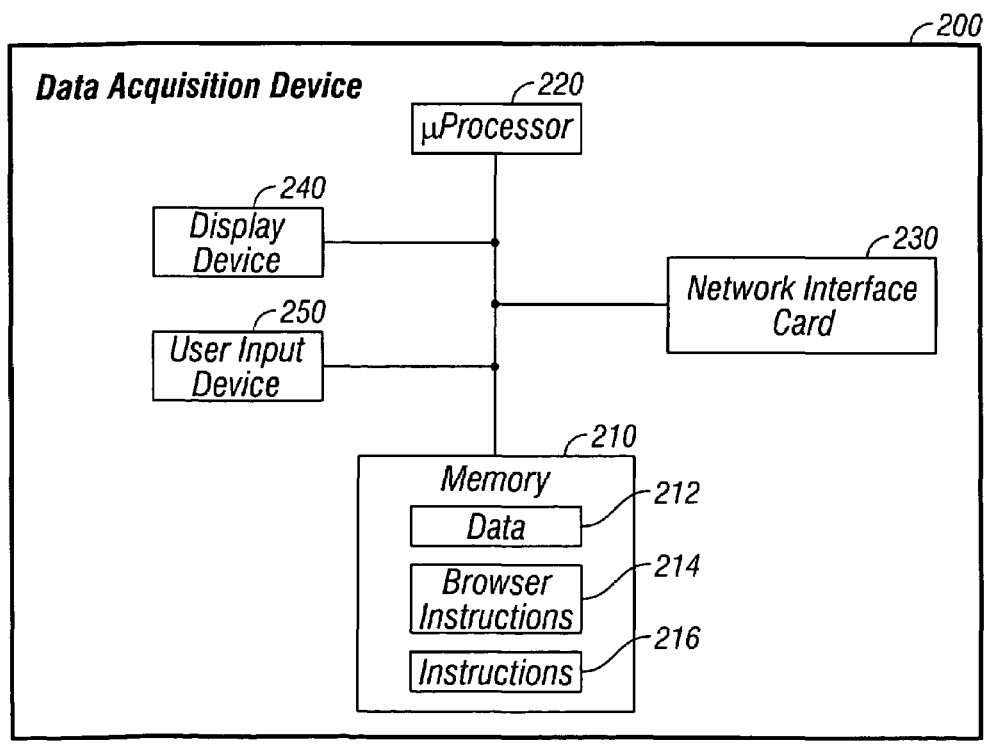
FIG. 2 shows a block diagram of a data acquisition device.

FIG. 2 illustrates a data acquisition device 200. Data acquisition device 200 may be similar to data acquisition device 110 in FIG. 1. As illustrated, data acquisition device 200 includes memory 210, a microprocessor 220, a network interface card 230, a display device 240, and a user input device 250.

Memory 210 may include RAM, ROM, CD-ROM, registers, and/or any other appropriate volatile or non-volatile information storage device. Memory 210 stores data 212, which may have been conveyed from a data distribution device, browser instructions 214, which dictate how data is to be displayed, and instructions 216, which dictate the lower level operations of the data acquisition device. Browser instructions 214 may be the Internet Explorer, the Netscape Navigator, or any other type of HTTP-based browser. Additionally, browser instructions 214 may be implemented for TCP/IP, TELNET, NTTP, or any other appropriate messaging protocol.

Microprocessor 220 may be a complex-instruction-set computer (CISC), a reduced-instruction-set computer (RISC), or any other appropriate device for manipulating information in a logical manner. Microprocessor 220 operates according to the instructions in memory 210.

Network interface card 230 may be an Ethernet card, an ATM card, or any other appropriate device for sending information to and receiving information from a communication network. Card 230 may operate in conjunction with or independent of microprocessor 220.

Display device 240, a type of user output device, may be a cathode ray tube (CRT) display, a liquid crystal display (LCD), a projector, or any other appropriate device for visually presenting information. Display device 240 may present user interfaces generated by microprocessor 220.

User input device 250 may be a keypad, a keyboard, a touch screen, a trackpad, a mouse, a microphone, a stylus, and/or any other appropriate device for detecting input from a user. Through the user input device, a user may enter commands for the data acquisition device.

In one mode of operation, microprocessor 220 generates a user interface according to browser instructions 214. Display device 240 then visually presents the user interface to a user. The microprocessor then determines whether data is desired and, if so, generates a subscription request. Determining that data is desired may be accomplished by detecting a user command indicating that a certain type of data is desired, determining that an application needs a certain type of data, or by any other appropriate technique. The subscription request may contain information regarding the data acquisition device, the requesting user, the type of data that is desired, the source of the data, and/or any other appropriate information. The request may then be sent through network interface card 230 to a data distribution device.

The data acquisition device then waits to receive a message through network interface card 230 regarding the selected service for providing the data. After such a message has been received, microprocessor 220 determines whether the selected service is a data pull service or a data push service.

If the selected service is a data push service, microprocessor 220, possibly with the assistance of network interface card 230, maintains a persistent connection with the serving data distribution device. The microprocessor then waits to receive responsive new data through network interface card 230. Once such data has been received, the microprocessor updates data 212. Furthermore, the microprocessor may update the user interface presented by display device 240 with the new data. The data acquisition device may continue to receive responsive new data and update the existing data until the microprocessor decides to break the connection or the connection is broken by the serving data distribution device.

If, however, the service is a data pull service, microprocessor 220 waits for a refresh interval to expire. The refresh interval may have been received in the message regarding the selected service. Once the refresh interval has expired, the microprocessor generates a message requesting new data and sends the message through network interface card 230 to the serving data distribution device. The data acquisition device then waits to receive a message containing responsive new data and a new refresh interval, if any. After receiving the message, the microprocessor updates data 212, and begins waiting for the new refresh interval to expire. The microprocessor may also update the user interface presented by display device 240 with the new data.

In certain implementations, the browser may have a hidden frame that acts as a mediator between the browser interface and the data distribution device. The hidden frame may have the ability to interpret the requests generated because of user actions and the responses sent by the data distribution device.

It should be understood that FIG. 2 only illustrates one implementation of a data acquisition device. Other data acquisition devices may have less, more, and/or a different arrangement of components. For example, a data acquisition device may not have a user input device and/or a display device. As another example, a data acquisition device may include additional applications in memory 210. Moreover, some of the instructions in memory 210 may be encoded on microprocessor 220. In addition, the applications and/or data in memory 210 may have a variety of segments.

Figure 3:
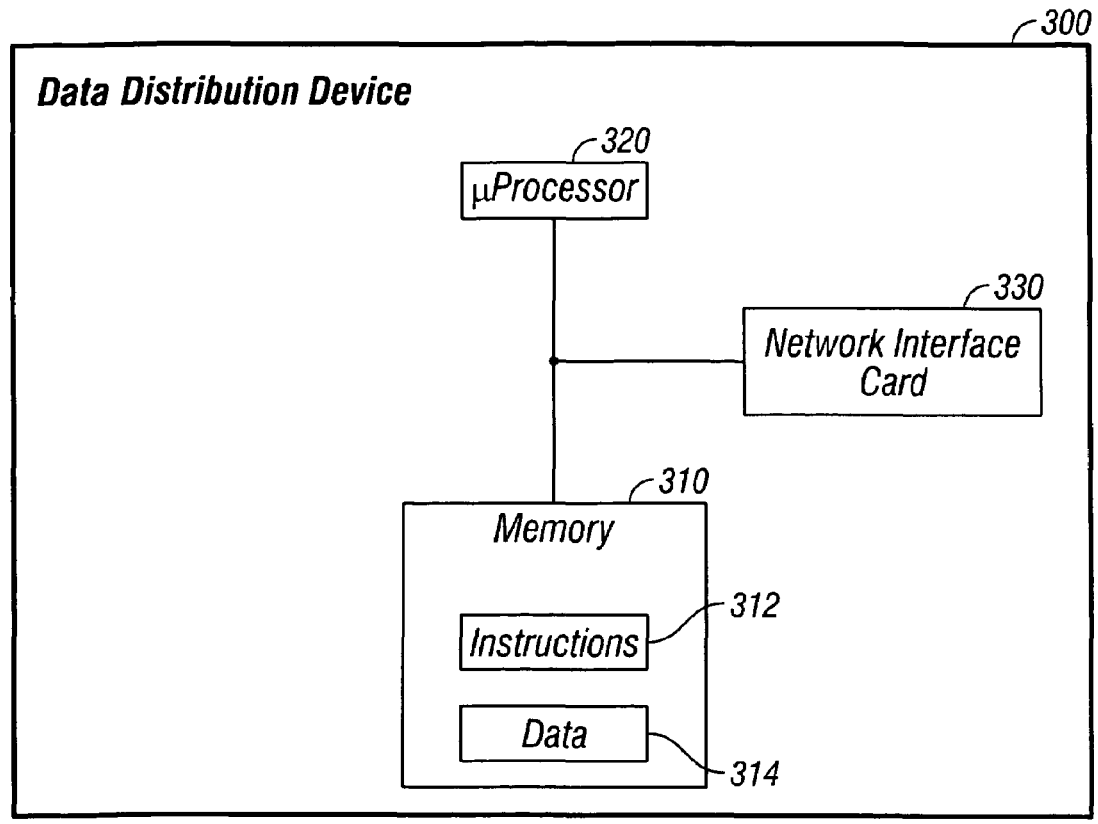
FIG. 3 shows a block diagram of a data distribution device.

FIG. 3 illustrates a data distribution device 300. Device 300 may be similar to data distribution device 130 in FIG. 1. As illustrated, data distribution device 300 includes memory 310, a microprocessor 320, and a network interface card 330.

Memory 310 may include RAM, ROM, CD-ROM, registers, and/or any other appropriate volatile or non-volatile information storage device. Memory 310 stores instructions 312, which dictate the lower level operations for the device, and data 314, which may include data that is responsive to a service request.

Microprocessor 320 may be a CISC, a RISC, or any other appropriate device for manipulating information in a logical manner. Microprocessor 320 operates according to the instructions in memory 310.

Network interface card 330 may be an Ethernet card, an ATM card, or any other appropriate card for sending information to and receiving information from a communication network. Card 330 may operate in conjunction with or independent of microprocessor 320.

In one mode of operation, device 300 waits to receive a message including a subscription request through network interface card 330. After receiving a subscription request, microprocessor 320 selects a type of service to fulfill the subscription request. Selecting a service type may entail analyzing a state of device 300 and/or one or more attributes of the data responsive to the subscription request. The device may determine attributes of the responsive data based on the subscription request. Items to consider may include the number of connections currently available at the device, the QOS desired for the responsive data, and/or the latency in the communication network. For example, if a high QOS is desired, a push service may be appropriate. On the other hand, if a data push service may not be used, perhaps because of few or no connections being available, but a data pull service is acceptable, a data pull service may be used. If a data pull service is to be used, microprocessor 320 also determines an initial refresh interval.

After selecting what type of service to use, microprocessor 320 generates a message regarding the selected service. If the selected service is a data pull service, the message may, for example, contain the refresh interval. If the selected service is a data push service, the message may, for example, indicate that a persistent connection should be established and/or maintained. The message may then be sent through network interface card 330 to the data acquisition device that initiated the subscription request. After this, any other negotiations between device 300 and the initiating data acquisition device regarding the service may be accomplished.

If the service is a data pull service, microprocessor 320 determines whether new data has become available. Data may become available, for example, by being received through network interface card 330. If data has become available, microprocessor 320 determines whether the data is responsive to the subscription request. Data may be responsive to the subscription request if the data is from a pre-designated source, pertains to certain subject matter, has an identifier for the initiating data distribution device, and/or has any other appropriate attribute. If the data is responsive to the subscription request, microprocessor 320 causes the data to be stored in data 314. Additionally, microprocessor 320 recalculates the refresh interval. The refresh interval may, for example, be recalculated based on the time interval between receiving new data that is responsive to the subscription request.

Microprocessor 320 also determines whether a data request has been received through network interface card 330. If a data request has been received, microprocessor 320 determines whether any responsive new data has become available since the last data request and, if so, generates a message containing the responsive new data and the recalculated refresh interval. The message may then be sent through network interface card 330.

Device 300 may repeatedly determine whether new data is available, determine whether the new data is responsive to the subscription request, store the new data if it is responsive, and send the stored data to the initiating data acquisition device in response to a data request.

If, on the other hand, the selected service is a data push service, the microprocessor, possibly with the help of network interface card 330, maintains a persistent connection with the initiating data acquisition device. The microprocessor also determines whether new data has become available and, if so, determines whether the data is responsive to the subscription request. If responsive new data is available, the microprocessor generates a message including the data. The message is then sent through network interface card 330 to the data acquisition device that initiated the subscription request.

Device 300 may repeatedly determine whether new data is available, determine whether the data is responsive to the subscription request, and send responsive new data to the initiating data acquisition device.

It should be understood that FIG. 3 only illustrates one implementation of a data distribution device. Other data distribution devices may have less, more, and/or a different arrangement of components. For example, a data distribution device may include a user input device and/or a user output device. As another example, a data distribution device may have some or all of the instructions in memory 310 encoded on the processor. As an additional example, a data distribution device may include additional applications in memory 310. Moreover, the applications and/or data in memory 310 may have a variety of segments.

In particular implementations, instructions 312 contain a subscriber module for registering a subscription request and a publisher module for sending data to the initiating data acquisition device. Upon receiving a subscription request, the subscriber module registers the request, which may include the subject of the data acquisition device's interest, an identifier for the data acquisition device, and/or a handle to push data, with the publisher. When a new event is available, such as data or a shutdown, the publisher pushes the event to the client by using JavaScript methods containing objects that include text. An event may be generated by scheduled event generators or other applications. The data acquisition device may then interpret the objects and, if appropriate, present text to the user. Other techniques may also be used.

Figure 4:
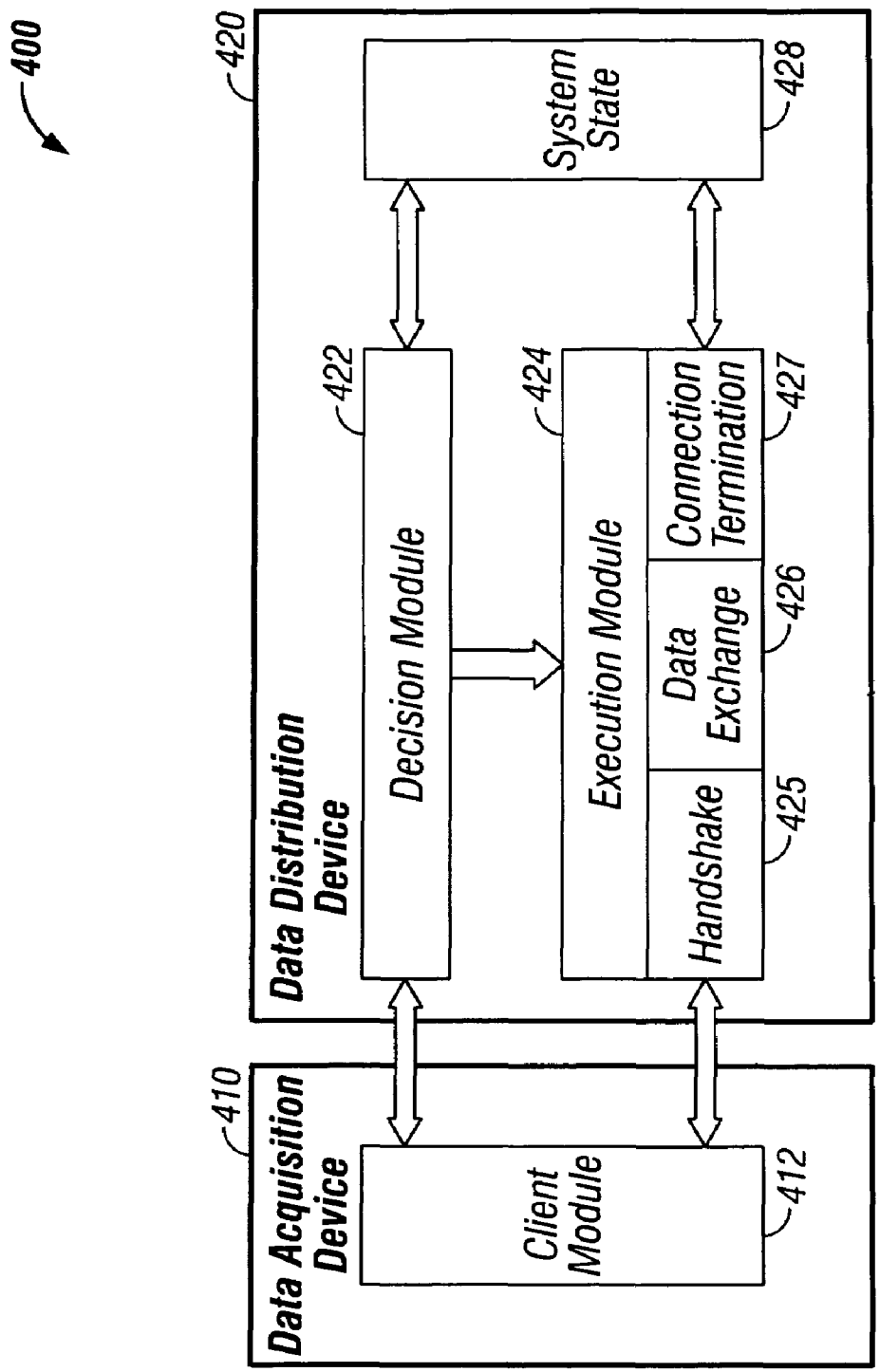
FIG. 4 shows a block diagram of a logic framework for dynamically managing data conveyance between computing devices.

FIG. 4 illustrates a logic framework 400 for dynamically managing data conveyance between computing devices. As illustrated, framework 400 is for a client-server model of a data acquisition device 410 and a data distribution device 420.

The development and functionality of framework 400 may be classified into three modules—a client module 412, a decision module 422, and an execution module 424. Client module 412 provides the functionalities of the client in the client-server architecture. Thus, client module 412 may hold the mechanisms for connecting to the server and the knowledge to interpret the responses sent by the server. In most implementations, the client is a Web-browser. Thus, client module 412 may hold the JavaScript to handle the interpretation process.

Decision module 422 and execution module 424, in turn, categorize the work on the server side, i.e., at data distribution device 420. Execution module 424 includes a handshake function 425, a data exchange function 426, and a connection termination function 427. These functions perform operations for execution module 424. In framework 400, the server side also stores the system state 428.

In operation, based on a current state of the system and at least one attribute of the data the client is requesting, decision module 422 determines whether a client should be admitted for service. If the service to the client is granted, then the request is passed on to execution module 424 for providing the type of service. Otherwise, the client will be notified with an error message.

Execution module 424 may use handshake function 425 to determine if the client may be handled with a data push service. If the handshake is successful, the module may try to service the client with a data push service. If the handshake is unsuccessful, the module may try to service the client with a data pull service. This sequence may occur because a handshake typically involves an acknowledge from the data acquisition device after it receives the initial service type message. If the data distribution device does not receive the acknowledgement, this tells the device that the data was probably lost or buffered in the proxies and that a data push service may not be the best approach. Thus, the data distribution device may change the service type to pull and resend the initial service type message to the data acquisition device.

In particular implementations, the future load on the data distribution device may also be taken into account. For example, the data distribution device may know at which hours of the day a high or low load occurs. Thus, if a subscription request arrives just before one of those times, the data distribution device may make a different determination as to what type of service is to be provided.

After data exchange function 426 finishes with the data conveyance, or when data conveyance is to be terminated, connection termination function 427 will release the resources used for the service. Connection termination may originate from the data acquisition device or the data distribution device.

Figure 5A:
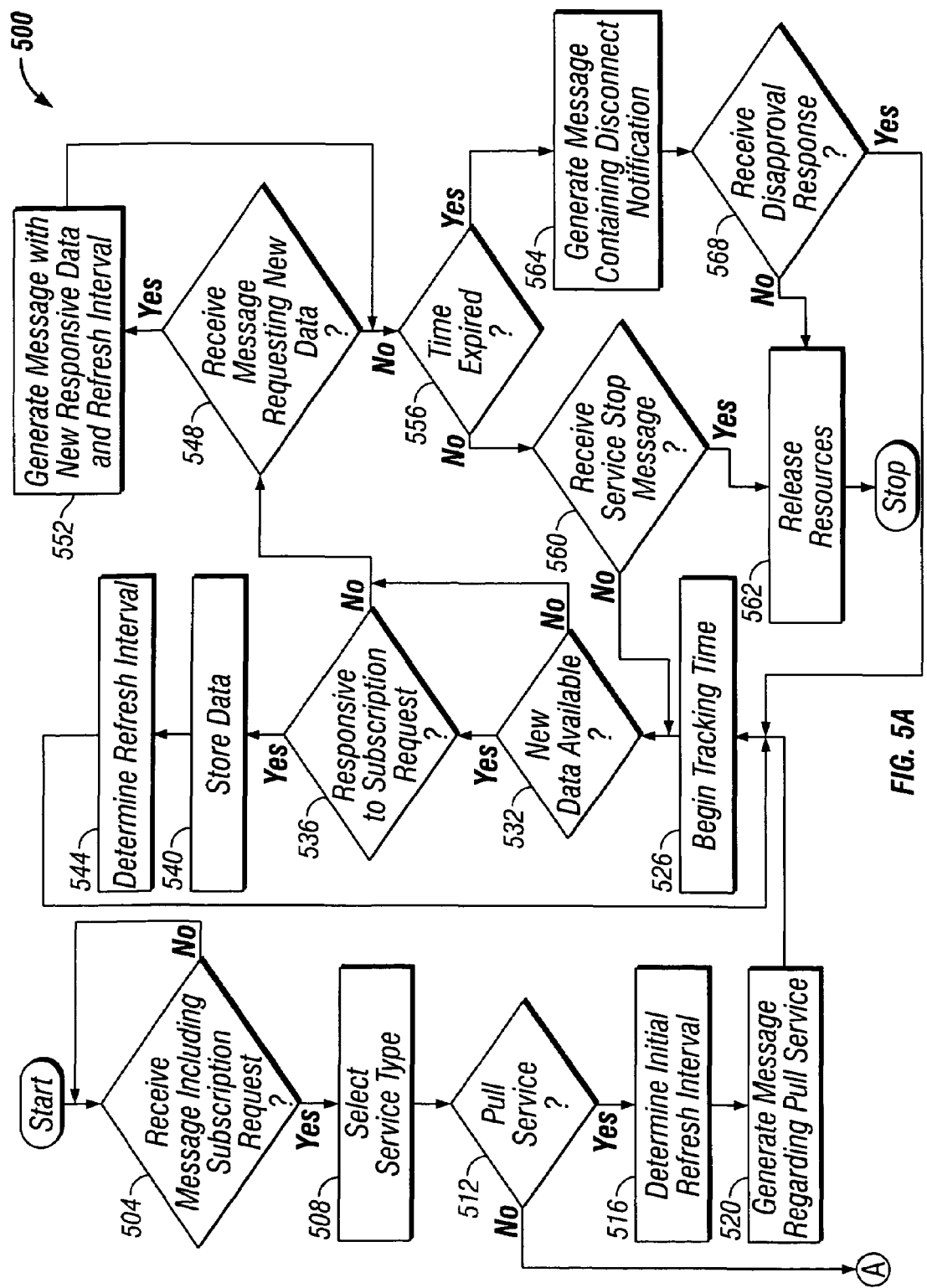
FIGS. 5A-B show a flow chart illustrating a process for dynamically managing data conveyance between computing devices.
Figure 5B:
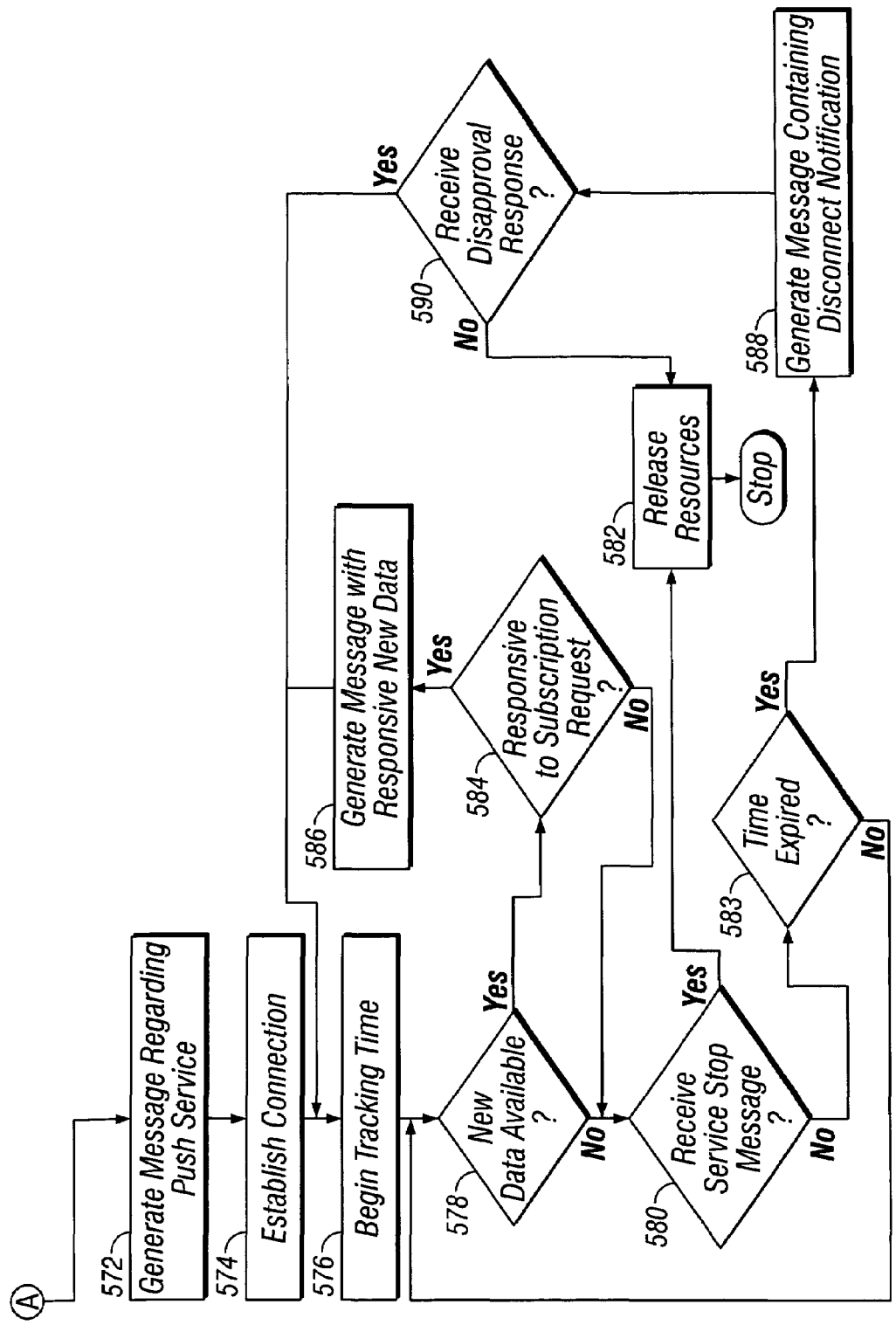

FIGS. 5A-B illustrate a process 500 for dynamically managing data conveyance between computing devices. Process 500 may be implemented by a data distribution device similar to data distribution device 130 in FIG. 1.

The process begins with waiting to receive a message including a subscription request at decision block 504. The subscription request may contain an indication of a data source, the type of data desired, the type of application for which the data is desired, and/or any other appropriate information regarding responsive data for the subscription. The subscription request may, for example, be a URL with a text message having tags that define the data.

After a subscription request has been received, the process calls for selecting a type of service to fulfill the subscription request at function block 508. Selecting a service type may entail analyzing a current state of the data distribution device and/or at least one attribute of data responsive to the subscription request. Items that may be considered include the number of connections currently available, the QOS desired for the responsive data, and/or network latency. Furthermore, the number and/or type of data services currently being handled may be considered. If a data push service may not be used, but a data pull service is acceptable, a data pull service may be used.

After selecting what type of service to use, the process calls for determining whether the service is a data pull service at decision block 512. If the service is a data pull service, the process continues with determining an initial refresh interval for the service at function block 516. The initial refresh interval may be determined based on an expected availability interval of responsive data, an expected amount of responsive data to be available, the overhead in setting up and disconnecting a connection to convey the data, and/or any other appropriate criteria. In particular implementations, however, the initial refresh interval may be a default value.

After determining the initial refresh interval, the process calls for generating a message regarding the data pull service at function block 520. The message may contain at least some of the parameters for the service, including the initial refresh interval. The message may then be sent to the data acquisition device that initiated the subscription request.

The process continues with beginning to track time at function block 526. Time may be tracked by establishing a timer, by recording the current time, or by any other appropriate technique. The process then calls for determining whether new data is available at decision block 532. The data may be text, graphics, audio, video, measurements, statistics, or any other appropriate type of information, and may have been received and/or generated at a data distribution device. If new data is available, the process calls for determining whether the data is responsive to the subscription request at decision block 536. Data may be responsive if the data is from a pre-designated source, regards certain subject matter, and/or has any other appropriate characteristics. If the data is responsive, the process continues with storing the data so that the data is associated with the subscription request at function block 540 and recalculating the refresh interval at function block 544. The refresh interval may be recalculated based on the interval between receiving responsive new data, for example. After this, the process calls for returning to function block 526, to reinitiate the time tracking process.

If, however, no new data is available, or new data is not responsive, the process calls for determining whether a message requesting new data has been received at decision block 548, the request indicating that responsive data that has become available since the last data request should be sent. Note that a connection is typically established before the data request is received. If a data request has been received, the process continues with generating a message with the new data and refresh interval, if any, at function block 552. The message may then be sent to the data acquisition device that initiated the subscription request.

Once the message has been generated, or if a data request has not been received, the process calls for determining whether a predetermined amount of time has expired at decision block 556, the amount of time being indicative of the period since last receiving responsive new data. This time period may be hard-coded or updated, and is generally on the order of minutes. If the predetermined amount of time has not expired, the process calls for determining whether a message indicating that the service should be stopped has been received at decision block 560. If a service stoppage message has been received, the resources for the selected service are released at function block 562, and the process is at an end. But if a service stoppage message has not been received, the process returns to check for data at decision block 532.

If, however, the predetermined amount of time has expired at decision block 556, the process calls for generating a message containing a disconnect notification at function block 564. The message may then be sent to the data acquisition device that initiated the subscription request. After sending the disconnect notification, the process then calls for determining whether a message including a disapproval response has been received at decision block 568. If a disapproval response has been received, the process calls for keeping the resources active and returning to function block 526. If, however, a disapproval response has not been received, the resources for the service are released at function block 562, and the process is at an end. A predetermined period of time, such as, for example, five minutes, may be allowed to expire before ending the process.

Returning to decision block 512, if the selected service is not a data pull service, the process calls for generating a message regarding the push service at function block 572. The message may include at least some of the parameters for the service. The message may then be sent to the data acquisition device that initiated the subscription request. The process then calls for establishing a persistent connection at function block 574.

After establishing the connection, the process calls for beginning to track time at function block 576. The process then calls for determining whether new data is available at decision block 578. If new data is not available, the process calls for determining whether a service stoppage message has been received at decision block 580. If a service stoppage message has been received, the resources for the service are released at function block 582, and the process is at an end. But if a service stoppage message has not been received, the process continues with determining whether a predetermined amount of time has expired at decision block 582, the amount of time corresponding to the interval since last receiving responsive new data. If the predetermined amount of time has not expired, the process calls for returning to decision block 578 to check for new data.

When new data is available, the process calls for determining whether the data is responsive to the subscription request at decision block 584. If the data is not responsive, the process calls for returning to decision block 580 to check for a service stoppage message. If, however, the data is responsive, the process calls for generating a message with the new data at function block 586. The message may then be sent to the data acquisition device that initiated the subscription request. The process then calls for returning to function block 576 to reinitiate the time tracking.

If the predetermined amount of time has expired at decision block 582, the process calls for generating a message containing a disconnect notification at function block 588. The message may then be sent to the data acquisition device that initiated the subscription request. The process then continues with determining whether a message including a disapproval response has been received at decision block 590. If a disapproval response has been received, the process calls for returning to function block 576. If, however, a disapproval response has not been received, the resources for the service are released at function block 582, and the process is at an end.

Although FIGS. 5A-B illustrate a process for dynamically managing the conveyance of data between computing devices, other implementations may have more have less, more, and/or a different arrangement of operations. For example, a process may not contain the operations regarding the data push service. As another example, a process may not update the refresh interval every time responsive new data is available. As an additional example, time tracking may begin after determining the service type, after initially receiving some new data, or at another appropriate time. As a further example, the new data and the refresh interval may be in different messages. As another example, a data distribution device may have multiple services active at one time. Thus, available data may have to be checked for applicability to multiple services and associated accordingly.

As an additional example, a request to stop the service may come from somewhere other than the data acquisition device. A service provider, for instance, may request that the device end the service with the data acquisition device. This may occur, for example, in a chat scenario—when the user closes the chat, the chat application may request the data distribution device to end the service with that specific user.

As a further example, selecting a service type may include sending an acknowledge request. If a response to the acknowledge request is not received, it may indicate that a data push service is not appropriate. Intervening servers, for instance, might be capturing messages initiated by a data distribution device. Thus, it may be beneficial to use a data pull service.

An acknowledge request may also be used during data service. If no response is received, a data distribution device could determine that a connection has failed. Furthermore, the data distribution device could decide to switch a data push service to a data pull service, to end the data service, or otherwise. The acknowledge request could be issued upon the occurrence of certain events, at designated times, or otherwise.

Figure 6A:
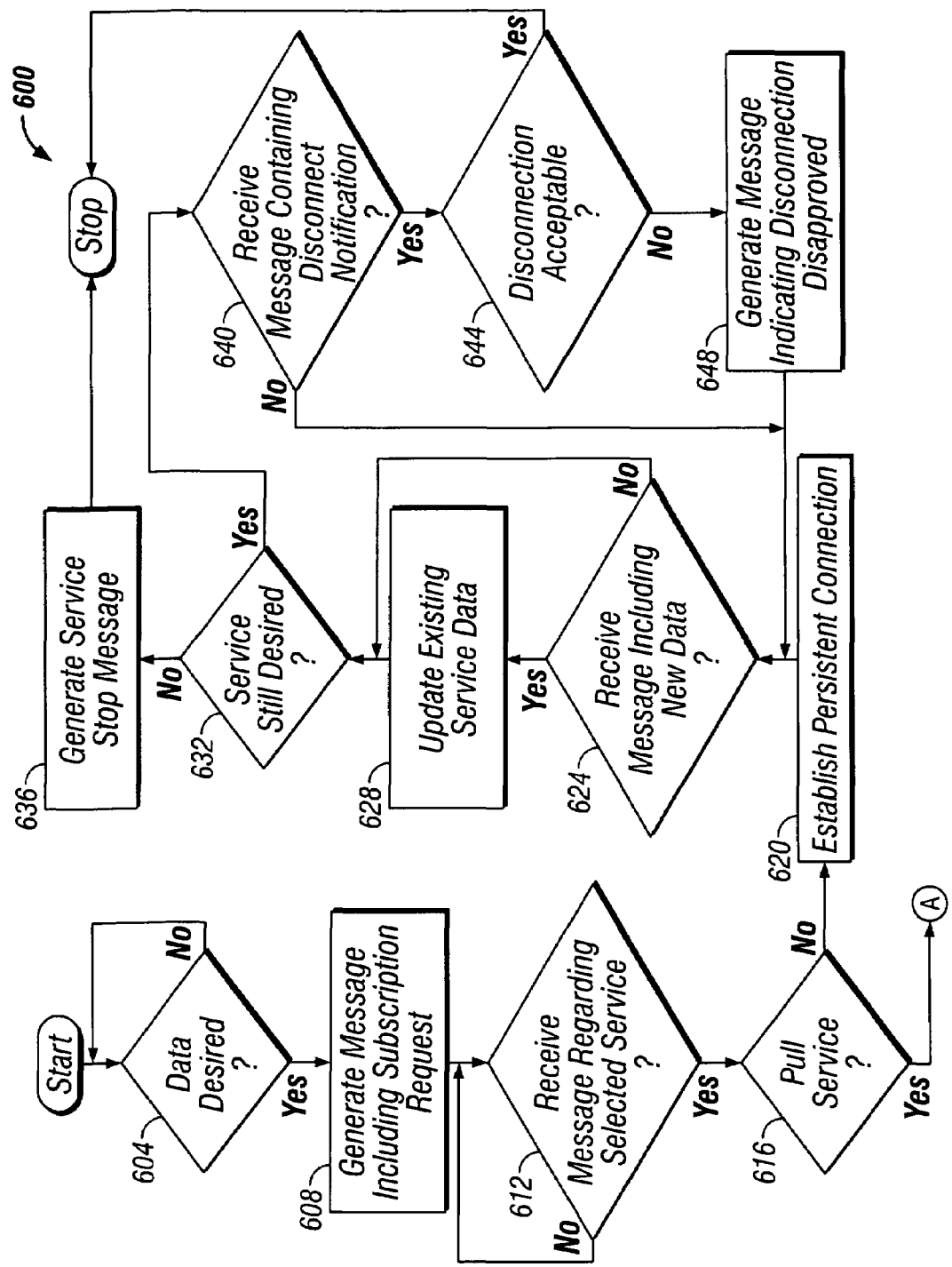
FIGS. 6A-B show a flow chart illustrating a process for dynamically managing data conveyance between computing devices.
Figure 6B:
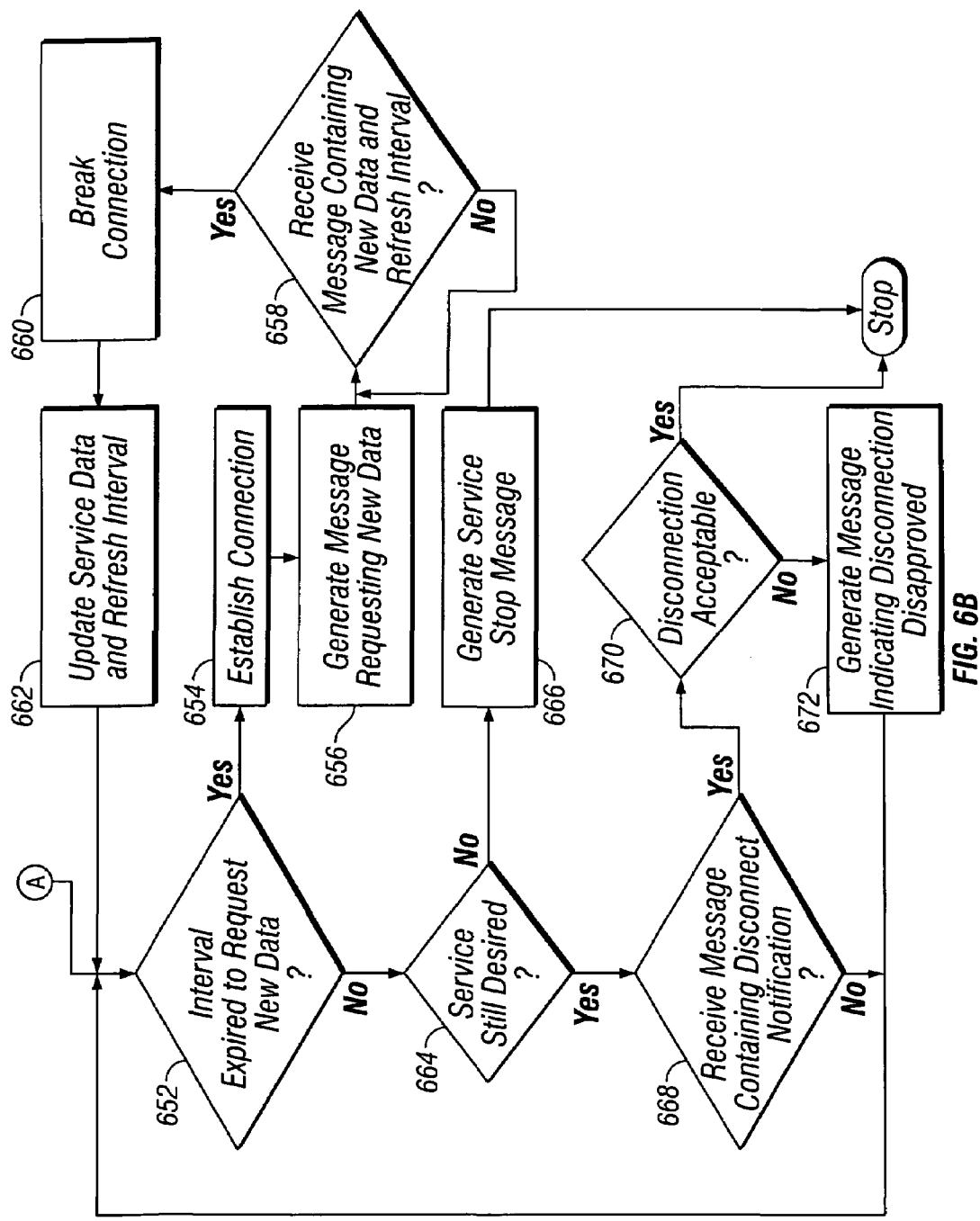

FIGS. 6A-B illustrate a process 600 for dynamically managing data conveyance between computing devices. Process 600 may be implemented by a device similar to data acquisition device 110 in FIG. 1.

The process begins with waiting to determine that data is desired by a process at decision block 604. A process may include a user command indicating that a certain type of data is desired, an application that requires data, or any other appropriate scheme that can utilize data.

Once data is desired, the process calls for generating a message including a subscription request at function block 608. The subscription request may contain information regarding the type of data that is desired, the source of the data, the requesting user, and/or any other appropriate information regarding the desired data. The message may then be sent to a data distribution device.

The process then calls for waiting to receive a message regarding the service selected for providing the data at decision block 612. After such a message has been received, the process calls for determining whether the selected service is a data pull service at decision block 616.

If the selected service is not a data pull service, the process calls for establishing a persistent connection at function block 620 and determining whether a message containing new data has been received at decision block 624. If new data has been received, the process calls for updating existing data for the service, if any, at function block 628.

After updating existing service data, or if new data has not been received, the process calls for determining whether the service is still desired at decision block 632. The service may not still be desired, for example, if a predetermined amount of data has been received, if a user has not interacted with the data in a predetermined period of time, if a command indicating that the service is no longer desired is detected, or otherwise. If the service is not still desired, the process calls for generating a message indicating that the service should be stopped at function block 636. The message may then be sent to the serving data distribution device, and the process is then at an end.

If, however, the service is still desired, the process continues with determining whether a message containing a disconnect notification has been received at decision block 640. If a disconnect notification has not been received, the process calls for returning to decision block 624 to check for more new data. If, however, a disconnect notification has been received, the process calls for determining whether disconnection is acceptable at decision block 644. Disconnection may be acceptable, for example, if the data is no longer desired. If disconnection is not acceptable, the process calls for generating a message indicating that disconnection is disapproved at function block 648. The message may then be sent to the serving data distribution device. The process then calls for returning to decision block 624 to check for more data. If, however, disconnection is acceptable, the process is at an end.

Returning to decision block 616, if the service is a data pull service, the process calls for determining whether a time interval has expired to request new data at decision block 652. The time interval for requesting new data may have arrived in the message regarding the selected service. If the time interval to request new data has expired, the process calls for establishing a connection with the serving data distribution device at function block 654 and generating a message requesting new data at function block 656. The message may then be sent to the serving data distribution device.

The process then calls for waiting to receive a message containing new data and a new refresh interval at decision block 658. After receiving the message, the process calls for breaking the connection at function block 660 and updating the data for the service and the refresh interval at function block 662. Updating could include replacing an existing entity with a received entity, adding a received entity to an existing entity, or any other appropriate technique. The process then calls for returning to decision block 652 to determine whether the time interval to request new data has expired.

If, however, the time interval to request new data has not expired, the process calls for determining whether the service is still desired at decision block 664. If the service is not still desired, the process calls for generating a service stoppage message at function block 666. The message may then be sent to the serving data distribution device, and the process is at an end.

If, however, the service is still desired, the process calls for determining whether a message containing a disconnect notification has been received at decision block 668. If a disconnect notification has not been received, the process calls for returning to decision block 652 to determine whether the time interval to request new data has expired. If, however, a disconnect notification has been received, the process calls for determining whether disconnection is acceptable at decision block 670. If disconnection is not acceptable, the process calls for generating a message indicating disconnection disapproval at function block 672. The message may then be sent to the serving data distribution device. The process then calls for returning to decision block 652. If, however, disconnection is acceptable, the process is at an end.

Although FIGS. 6A-B illustrate a process for dynamically managing data conveyance between computing devices, other implementations may have less, more, and/or a different arrangement of operations. For example, a process may not contain the operations regarding the push data service. As another example, a process may not check for disconnect notifications. As a further example, the refresh interval may not be updated. As an additional example, checking for time expiration, for whether a service is still desired, and/or for a disconnect notification may occur in any order or may not occur at all. As another example, a process may determine whether an acknowledge request has been received and, if an acknowledge request has been received, generate a response to the acknowledge request. The acknowledge request could be received before receiving the message regarding the selected service (i.e., before block 612), during data service (i.e., after block 620 or block 652), or at any other appropriate time.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally data acquisition from each other and typically interact through a communication network. The relationship of client and server arises by virtue of computer programs running on the respective computers and having a client-server relationship to each other.

Although only a few implementations have been described in detail above, other modifications are possible. Portions of this disclosure discuss managing the conveyance of data between computing devices by selecting between a data push service and a data pull service to provide the data. This may be implemented by one or more of the systems and/or techniques disclosed, or other applicable systems and techniques. Other portions discuss managing the conveyance of data between computing devices by adjusting the refresh interval for a pull service. This also may be implemented by one or more of the described systems and/or techniques, or other applicable systems and techniques. Also, the logic flows depicted in FIGS. 5 and 6 do not require the particular order shown, or sequential order, to achieve desirable results. In certain implementations, moreover, multitasking and parallel processing may be preferable.

Other embodiments may be within the scope of the following claims.

What is claimed is:

1. A method performed by a data distribution device, the method comprising:
   implementing a data pull service in response to a subscription request from a data acquisition device, the data pull service having a first refresh interval, the first refresh interval indicating when the data distribution device should be contacted regarding data responsive to the subscription request;
   determining whether new data is available;
   if new data is available, determining whether the new data is responsive to the subscription request;
   if the new data is responsive to the subscription request, determining an interval at which responsive new data is becoming available;
   determining a second refresh interval for the data pull service based at least on the determined interval, the second refresh interval indicating when the data distribution device should be contacted regarding data responsive to the subscription request; and
   generating a message for the data acquisition device, the message comprising the second refresh interval.

2. The method of claim 1, further comprising:
   determining whether a data pull request for the data pull service has been received; and
   if the data pull request has been received, sending the message.

3. The method of claim 1, further comprising:
   receiving a message comprising a subscription request;
   determining an attribute of data responsive to the subscription request; and
   selecting, based on a current state of the data distribution device and the attribute of the responsive data, between the data pull service and a data push service for providing the responsive data.

4. The method of claim 3, further comprising:
   if the selected service comprises the data pull service, determining the first refresh interval; and
   sending a message comprising the first refresh interval.

5. The method of claim 1, further comprising:
   determining whether the new data is responsive to a subscription request for a data push service; and
   if the data is responsive to a subscription request for a data push service, sending a message comprising the data.

6. The method of claim 1, further comprising:
   tracking an amount of time for responsive new data becoming available; and
   sending a message comprising a disconnect notification if a predefined period of time has expired.

7. The method of claim 1, wherein determining a second refresh interval comprises analyzing intervals at which responsive new data is becoming available.

8. The method of claim 1, further comprising:
   determining whether a message indicating that the service should be stopped has been received; and
   if a stoppage message has been received, releasing resources for the service.

9. The method of claim 1, further comprising:
   sending a message comprising an acknowledge request; and
   determining whether a response to the acknowledge request has been received.

10. The method of claim 9, further comprising deciding to use a data pull service if a response to the acknowledge request has not been received.

11. The method of claim 1, further comprising sending the responsive new data in response to a data pull request.

12. The method of claim 1, wherein implementing a data pull service in response to a subscription request from a data acquisition device comprises processing a subscription request generated by a mobile client.

13. The method of claim 1, wherein determining whether new data is available comprises analyzing data generated by an automated process.

14. The method of claim 1, further comprising:
    receiving a message comprising a subscription request; and
    selecting, based on a current state of the data distribution device, between a first type of data service and a second type of data service for providing data responsive to the subscription request.

15. A system comprising:
    a data distribution device comprising:
       a communication network interface operable to receive a subscription request from a data acquisition device; and
       a processor operable to:
          implement a data pull service in response to the subscription request, the data pull service having a first refresh interval, the first refresh interval indicating when the data distribution device should be contacted regarding data responsive to the subscription request;
          determine whether new data is available,
          if new data is available, determine whether the new data is responsive to the subscription request,
          if the new data is responsive to the subscription request, determine an interval at which responsive new data is becoming available,
          determine a second refresh interval for the data pull service based at least on the determined interval, the second refresh interval indicating when the data distribution device should be contacted regarding data responsive to the subscription request; and
          generate a message for the data acquisition device, the message comprising the second refresh interval.

16. The system of claim 15, wherein:
    the communication network interface is further operable to receive a data pull request for the data pull service; and
    the processor is further operable to:
       determine whether the data pull request has been received, and
       if the data pull request has been received, initiate sending of the message.

17. The system of claim 15, wherein:
    the communication network interface is further operable to receive a message comprising a subscription request; and
    the processor is further operable to:
       determine an attribute of data responsive to the subscription request, and
       select, based on a current state of the data distribution device and the attribute of the responsive data, between the data pull service and a data push service for providing the responsive data.

18. The system of claim 17, wherein the processor is further operable to:
    if the selected service comprises the data pull service, determine the first refresh interval; and
    generate a message comprising the first refresh interval.

19. The system of claim 15, wherein the processor is further operable to:

determine whether the new data is responsive to a subscription request for a data push service; and if the data is responsive to a subscription request for a data push service, generate a message comprising the data.

20. The system of claim 15, wherein the processor is further operable to:

track an amount of time for responsive new data becoming available; and generate a message comprising a disconnect notification if a predefined period of time has expired.

21. The system of claim 15, wherein the processor is operable to analyze intervals at which responsive new data is becoming available to determine the second refresh interval.

22. The system of claim 15, wherein the data distribution device comprises a sewer.

23. The system of claim 15, wherein the processor is further operable to:

generate a message comprising an acknowledge request; and determine whether a response to the acknowledge request has been received.

24. The system of claim 23, wherein the processor is farther operable to decide to use a data pull service if a response to the acknowledge request has not been received.

25. The system of claim 15, wherein the processor is further operable to send the responsive new data in response to a data pull request.

26. The system of claim 15, wherein the processor is operable to process a subscription request generated by a mobile client to implement a data pull service in response to a subscription request from a data acquisition device.

27. The system of claim 15, the processor is operable to analyze data generated by an automated process to determine whether new data is available.

28. The system of claim 15, wherein the processor is operable to select, based on a current state of the data distribution device, between a first type of data service and a second type of data service for providing data responsive to the subscription request.

29. An article comprising a machine-readable medium storing instructions operable to cause a data distribution device to perform operations comprising:

implementing a data pull service in response to a subscription request from a data acquisition device, the data pull service having a first refresh interval, the first refresh interval indicating when the data distribution device should be contacted regarding data responsive to the subscription request;

determining whether new data is available;

if new data is available, determining whether the new data is responsive to the subscription request;

if the new data is responsive to the subscription request, determining an interval at which responsive new data is becoming available;

determining a second refresh interval for the data pull service based at least on the determined interval, the second refresh interval indicating when the data distribution device should be contacted regarding data responsive to the subscription request; and generating a message for the data acquisition device, the message comprising the second refresh interval.

30. The article of claim 29, wherein the instructions are farther operable to cause a data distribution device to perform operations comprising:

determining whether a data pull request for the data pull service has been received; and if the data pull request has been received, generating the message.

31. The article of claim 29, wherein the instructions are farther operable to cause a data distribution device to perform operations comprising:

determining whether a message comprising a subscription request has been received;

determining an attribute of data responsive to the subscription request; and selecting, based on a current state of the data distribution device and the attribute of the responsive data, between the data pull service and a data push service for providing the responsive data.

32. The article of claim 31, wherein the instructions are further operable to cause a data distribution device to perform operations comprising:

if the selected service comprises the data pull service, determining the first refresh interval; and generating a message comprising the first refresh interval.

33. The article of claim 29, wherein the instructions are further operable to cause a data distribution device to perform operations comprising:

determining whether the new data is responsive to a subscription request for a data push service; and if the data is responsive to a subscription request for a data push service, generating a message comprising the data.

34. The article of claim 29, wherein the instructions are further operable to cause a data distribution device to perform operations comprising:

tracking an amount of time for responsive new data becoming available; and generating a message comprising a disconnect notification if a predefined period of time has expired.

35. The article of claim 29, wherein the instructions are operable to cause a data distribution device to analyze the intervals at which responsive new data is becoming available to determine the second refresh interval.

36. The article of claim 29, wherein the instructions are further operable to cause a data distribution device to perform operations comprising:

generating a message comprising an acknowledge request; and determining whether a response to the acknowledge request has been received.

37. The article of claim 36, wherein the instructions are further operable to cause a data distribution device to perform operations comprising deciding to use a data pull service if a response to the acknowledge request has not been received.

38. The article of claim 29, wherein the instructions are further operable to cause one or more machines to send the responsive new data in response to a data pull request.

39. The article of claim 29, wherein the instructions are operable to cause a data distribution device to process a subscription request generated by a mobile client to implement a data pull service in response to a subscription request from a data acquisition device.

40. The article of claim 29, wherein the instructions are operable to cause a data distribution device to analyze data generated by an automated process to determine whether new data is available.

41. The article of claim 29, wherein the instructions are operable to cause a data distribution device to select, based on a current state of the data distribution device, between a first type of data service and a second type of data service for providing data responsive to the subscription request.

42. A system comprising:
a data acquisition device operable to:
  determine whether data is desired by a process,
  if data is desired, send a message comprising a subscription request,
  determine whether an acknowledge request has been received,
  if an acknowledge request has been received, send a response,
  determine whether a message regarding a selected service has been received,
  if a message regarding a selected service has been received, determine whether the selected service is a data pull service or a data push service based on the received message, the data pull service having a first refresh interval,
  if the service is a data pull service:
    determine whether the first refresh interval has expired;
    if the first refresh interval has expired, send a message requesting new data;
    determine whether a message comprising new data and a second refresh interval has been received; and
    if a message comprising new data and a second refresh interval has been received, update existing data and the first refresh interval,
  if the selected service is a data push service:
    establish a persistent connection;
    determine whether a message comprising new data has been received; and
    if a message comprising new data has been received, update existing data,
  determine whether the selected service is still desired,
  if the service is not still desired, send a message indicating that the service should be stopped,
  determine whether a message comprising a disconnect notification has been received, and
  if a disconnect notification has been received, determine whether disconnection is acceptable; and
a data distribution device operable to:
  determine whether the message comprising the subscription request has been received,
  if a subscription request has been received:
    determine an attribute of data responsive to the subscription request;
    send a message comprising an acknowledge request;
    determine whether a response to the acknowledge request has been received; and
    select, based on a current state of the data distribution device, the attribute of the responsive data, and the response to the acknowledge request, if any, between the data pull service and the data push service for providing the responsive data,
  if the selected service is a data pull service:
    determine the first refresh interval, the first refresh interval indicating when the data acquisition device should contact the data distribution device regarding data responsive to the subscription request;
    send the message regarding the selected service, the message comprising the refresh interval;
    determine whether new data is available;
    if new data is available, determine whether the new data is responsive to the subscription request;
    if the new data is responsive, store the responsive new data;
    determine the second refresh interval for the data pull service based on intervals at which responsive new data is becoming available, the second refresh interval indicating when the data acquisition device should contact the data distribution device regarding data responsive to the subscription request;
    receive the message requesting new data; and
    if the message requesting new data has been received, send the message comprising the new data and the second refresh interval,
  if the selected service is a data push service:
    send the message regarding the selected service;
    determine whether new data is available;
    if new data is available, determine whether the data is responsive to the subscription request; and
    if the data is responsive to the subscription request, send a message comprising the data,
  track an amount of time for responsive new data becoming available,
  send the message comprising a disconnect notification if a predefined period of time has expired,
  determine whether the service stoppage message has been received, and release resources for the service if the service stoppage message has been received.

* * * * *